(12) United States Patent
Furuya

(10) Patent No.: US 8,352,836 B2
(45) Date of Patent: Jan. 8, 2013

(54) ERROR ADDITION APPARATUS

(75) Inventor: Takashi Furuya, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 453 days.

(21) Appl. No.: 12/683,072

(22) Filed: Jan. 6, 2010

(65) Prior Publication Data

US 2010/0174971 A1 Jul. 8, 2010

(30) Foreign Application Priority Data

Jan. 8, 2009 (JP) ................. 2009-002485

(51) Int. Cl.
H03M 13/33 (2006.01)
H03M 13/53 (2006.01)
(52) U.S. Cl. ........ 714/776; 714/731
(58) Field of Classification Search .......... None
See application file for complete search history.

(56) References Cited

U.S. PATENT DOCUMENTS 5,809,093 A * 9/1998 Cooper .......... 375/365
6,487,686 B1 * 11/2002 Yamazaki et al. .......... 714/703

FOREIGN PATENT DOCUMENTS

JP 2002-330192 11/2002

* cited by examiner

Primary Examiner — Ajay Bhatia
Assistant Examiner — Dipakkumar Gandhi
(74) Attorney, Agent, or Firm — Greer, Burns & Crain, Ltd.

(57) ABSTRACT

An error addition apparatus receives a data signal D having a frame format having a specific signal inserted into its front, adds errors to the data signal D, and outputs a resulting signal. The apparatus has an error addition regulation unit for receiving a frame synchronization signal F, indicative of a timing at which the front of the frame of the data signal has been inputted, and regulating the errors such that the errors are added to positions other than a region of the specific signal. Accordingly, errors are not added to a specific signal.

4 Claims, 5 Drawing Sheets

ERROR ADDITION APPARATUS

FIELD OF THE INVENTION

The present invention relates to an error addition apparatus, and more particularly, to an error addition apparatus for adding errors to a data signal having a predetermined frame format, assigning the data signal to a target test apparatus, and testing an error correction function, wherein, although errors are added at a high rate, a test can be performed on the part of the target test apparatus with frame synchronization established.

BACKGROUND OF THE INVENTION

In general, a data signal is transmitted in a unit of a frame having a predetermined format. A predetermined specific signal is inserted into the front of the data signal having such a frame format so that frame synchronization is performed on the receiving side.

For example, as shown in FIG. 6, the frame of a synchronization digital transmission system, such as an Optical Transport Network (OTN) used for an optical network, has a frame format in which a specific signal of a predetermined bit length, called a Frame Alignment Signal (FAS), is inserted into the front of the frame.

Some transmission apparatuses that deal with a data signal having such a frame format have a function of detecting error bits of a received data signal, and correcting the error bits (i.e., Forward Error Correction (FEC)). To perform a test, an error addition apparatus for adding errors to a data signal is being used.

FIG. 7 shows the configuration of a conventional error addition apparatus 10.

A data signal D configured to have the above frame format and outputted in, for example, an N-bit width (N is plural) from a data signal generation unit 5, and an error signal E (for example, a pseudo random signal) outputted in an N-bit width from an error signal generation unit 11 are inputted to an error addition unit 12. The error addition unit 12 adds errors, corresponding to the error signal E, to the data signal D and outputs a data signal D' of an N-bit width.

Meanwhile, the data signal generation unit 5 and the error signal generation unit 11 receive, for example, a common clock (not shown) such that N-bit data outputted from the error signal generation unit 11 is synchronized with N-bit data of the data signal D outputted from the data signal generation unit 5.

Assuming that, for example, the N-bit data of the data signal D include $d_1$ to $d_N$ and the N-bit data of the error signal E include $e_1$ to $e_N$, such error addition is performed by finding exclusive OR (EXOR) for each of pairs of bit data $(d_1,e_1)$, $(d_2,e_2), \ldots, (d_N,e_N)$, and a result to which errors are added is outputted as the N-bit data signal D'.

Here, an output rate of the error signal E is set to be variable within a range less than an input rate of the data signal D under the control of a controller (not shown). A test for the FEC function of the target test apparatus is performed while changing the output rate of the error signal E. In the case in which a test for the target test apparatus is actually performed, the data signal D' of an N-bit width is converted into serial data and then added to the target test apparatus.

Meanwhile, technology for adding errors to a data signal is disclosed in, for example, the Japanese Patent Laid-Open Publication No. 2002-330192.

DESCRIPTION OF REFERENCE NUMERALS OF PRINCIPAL ELEMENTS IN THE DRAWINGS

Figure 1:
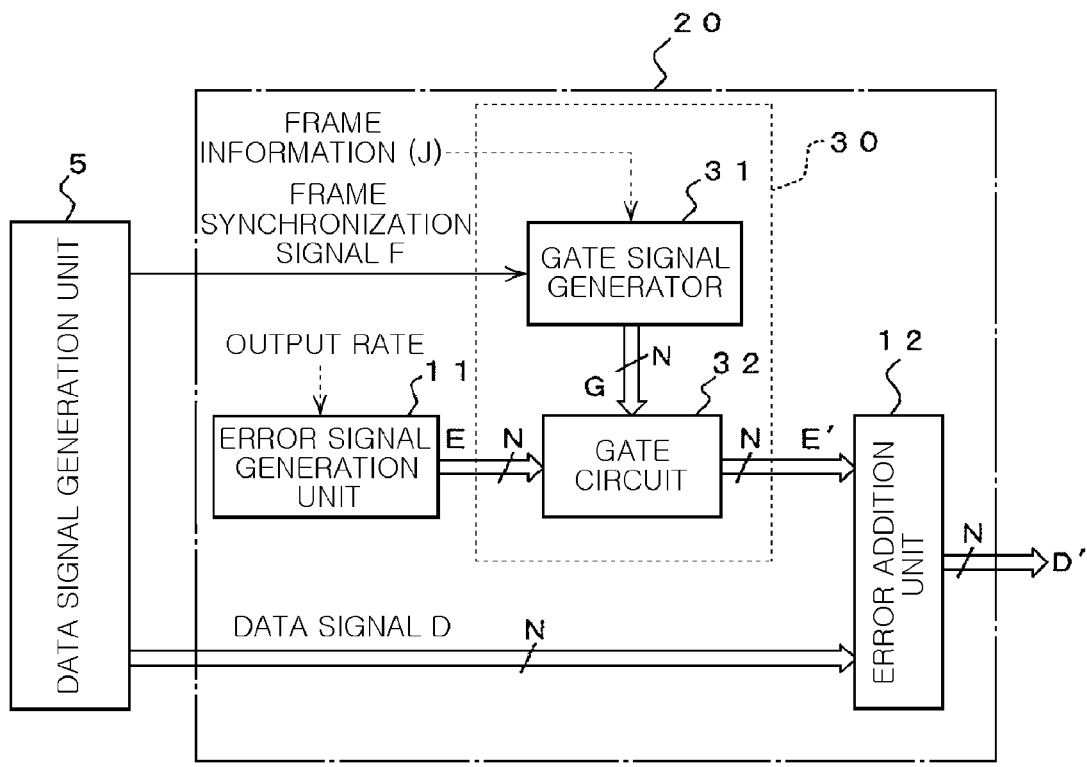
FIG. 1 shows a configuration according to an embodiment of the present invention.

5: data signal generation unit
11: error signal generation unit
12: error addition unit
20: error addition apparatus
30: error addition regulation unit
31: gate signal generator
32: gate circuit

DETAILED DESCRIPTION OF THE INVENTION

Problems to be solved by the Invention

However, in the conventional error addition apparatus, a timing at which an error is added is not defined. Accordingly, in the case in which an error is added at a high rate, the error is added to the region of a specific signal (FAS), placed at the front of a frame, at a high rate. Accordingly, there are problems in that frame synchronization on the part of a target test apparatus is not established, and a test for an error correction function is not correctly performed.

The present invention has been made to solve the problems, and an object of the present invention is to provide an error addition apparatus which is capable of performing a test with frame synchronization established on the part of a target test apparatus although an error is added at a high rate.

Solution to the Problems

To achieve the above object, according to the present invention, an error addition apparatus for receiving a data signal having a frame format having a specific signal inserted into its front, adding error bits to the data signal, and outputting a resulting signal, the error addition apparatus comprises: an error addition regulation unit for receiving a frame synchronization signal, indicative of a timing at which the front of the frame of the data signal has been inputted, and regulating the error bits such that the error bits are added to positions other than a region of the specific signal.

Preferably, the error addition regulation unit regulates the error bits such that the error bits are added to the positions other than the region of the specific signal, based on the frame synchronization signal of the data signal and frame information of the data signal.

Preferably, the frame information is a bit length of a Frame Alignment Signal (FAS), which is the specific signal at the front of a frame.

Preferably, the error addition regulation unit comprises a gate signal generation unit and a gate circuit. The gate signal generation unit receives the frame synchronization signal, generates a gate signal, including bit data having a predetermined number of bits at a timing at which the bit data, having the predetermined number of bits and including the region of the FAS at the front of the data signal, are outputted based on the frame information of the data signal, and outputs the generated gate signal to the gate circuit.

According to the present inventions, an error addition method comprising the steps of receiving a data signal having a frame format having a specific signal inserted into its front, receiving a frame synchronization signal, indicative of a timing at which the front of the frame of the data signal has been inputted, and regulating the error bits such that the error bits are added to positions other than a region of the specific signal.

Preferably, the step of regulating the error bits such that the error bits are added to positions other than a region of the specific signal comprises regulating the error bits such that the error bits are added to the positions other than the region of the specific signal, based on the frame synchronization signal of the data signal and frame information of the data signal.

Effects

As described above, the error addition apparatus of the present invention includes an error addition regulation unit for receiving a frame synchronization signal, configured to indicate timing and inputted to the front of the frame of the data signal has been added, and for regulating errors such that the errors are added to positions other than the region of a specific signal. Accordingly, although errors are added at a high rate, a test can be performed with frame synchronization established on the part of a target test apparatus because the error is not added to the specific signal.

Best Mode for Implementing the Invention

Hereinafter, an embodiment of the present invention is described with reference to the accompanying drawings.

FIG. 1 shows the configuration of an error addition apparatus 20 according to the present invention.

The error addition apparatus 20, in a similar way to the conventional error addition apparatus 10, includes an error signal generation unit 11 and an error addition unit 12. The error addition unit 12 adds errors, corresponding to an error signal E (for example, a pseudo random signal) outputted in an N-bit width from an error signal generation unit 11, to a data signal D configured to have the above frame format and outputted in, for example, an N-bit width from a data signal generation unit 5 and outputs a data signal to which the errors are added. In the present embodiment, however, an error addition regulation unit 30 is provided between the error signal generation unit 11 and the error addition unit 12.

The error addition regulation unit 30 receives a frame synchronization signal F, indicating a timing at which the header signal (N-bit data including an FAS) of a frame of the data signal D has been inputted, from the data signal generation unit 5 and regulates error bits based on previously received frame information J about the data signal D under the control of a controller (not shown) such that the error bits are placed at positions other than the region of a specific signal in the error addition unit 12.

The term ⌈frame information⌋ in this specification refers to information based on the type of a frame, such as an SDH or an OTN. That is, in the apparatus of the present invention, assuming that the type of a frame is ⌈SDH⌋, frame information for SDH is added to a data signal. An error bit can be inserted into a specific position according to various frames based on the frame information.

The error addition regulation unit 30 consists of a gate signal generator 31 and a gate circuit 32.

The gate signal generator 31 receives the frame synchronization signal F, generates an N-bit gate signal G for regulating errors such that the errors are not added to the region of an FAS in synchronization with a timing at which N-bit data, including the FAS at the front of the data signal D, are outputted based on the frame information of the data signal D, and outputs the N-bit gate signal G to the gate circuit 32.

Here, a minimum piece of frame information necessary to regulate errors such that the errors are not added to the region of an FAS is the bit length of the FAS. In this case, it is assumed that the gate signal G in which data of the same region as one into which the FAS of the data signal D has been inserted are all 0 and data of the remaining regions are all 1, from among N-bit data of the gate signal G outputted in synchronization with a frame synchronization signal F, is outputted.

Figure 2:
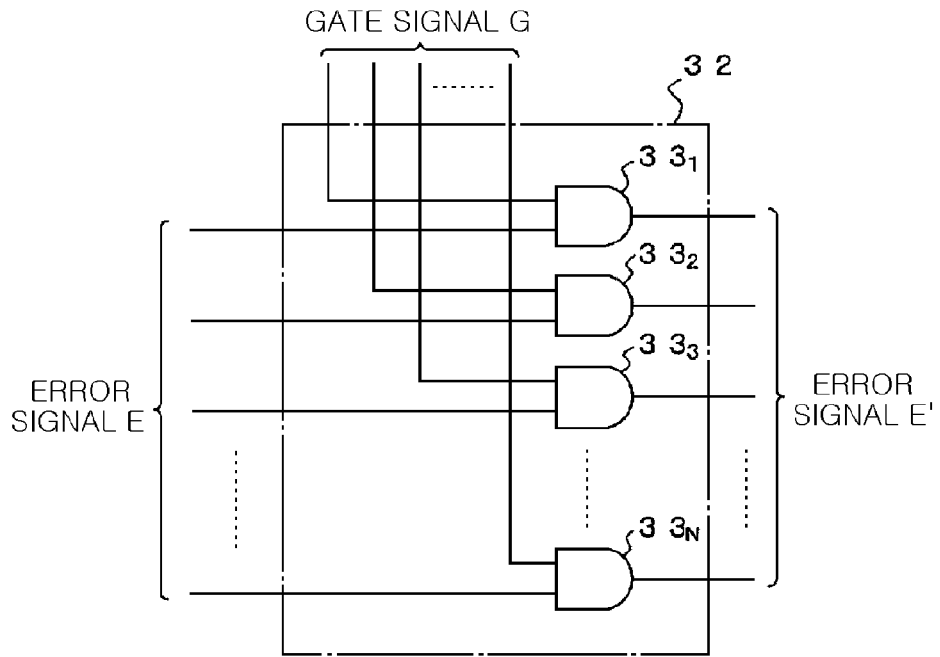
FIG. 2 is an exemplary circuit diagram of integral elements of the embodiment.

The gate circuit 32, as shown in, for example, FIG. 2, includes an N number of AND circuits $33_1$ to $33_N$. The gate circuit 32 performs an AND operation on the gate signal G and the error signal E and outputs a result of the AND operation as a regulated error signal E'.

The error signal E' generated as described above, together with the data signal D, is inputted to the error addition unit 12.

Figure 3:
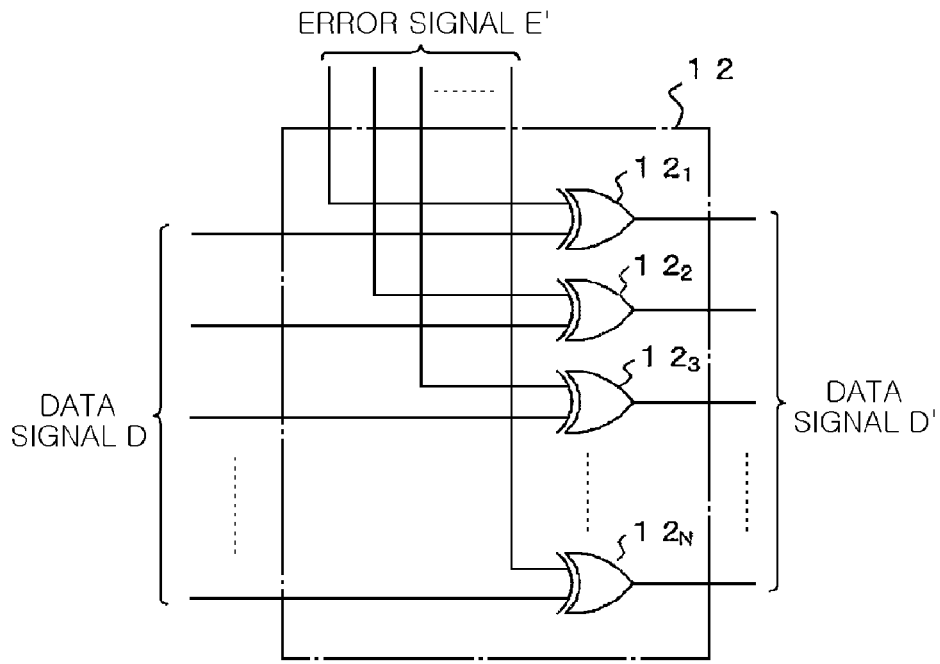
FIG. 3 is an exemplary circuit diagram of integral elements of the embodiment.

The error addition unit 12, as shown in FIG. 3, includes an N number of EXOR circuits $12_1$ to $12_N$. The error addition unit 12 performs an EXOR operation on each of the bit data of the data signal D and each of the bit data of the error signal E' and outputs a result of the EXOR operation as the data signal D' to which errors are added.

Meanwhile, the data signal generation unit 5, the error signal generation unit 11, and the gate signal generator 31 receives, for example, a common clock (not shown). A timing is adjusted such that N-bit data outputted from the error signal generation unit 11 and N-bit data outputted from the gate signal generator 31 are synchronized with N-bit data of the data signal D outputted from the data signal generation unit 5.

Next, an example of the operation of the error addition apparatus 20 constructed as above is described.

Figure 4:
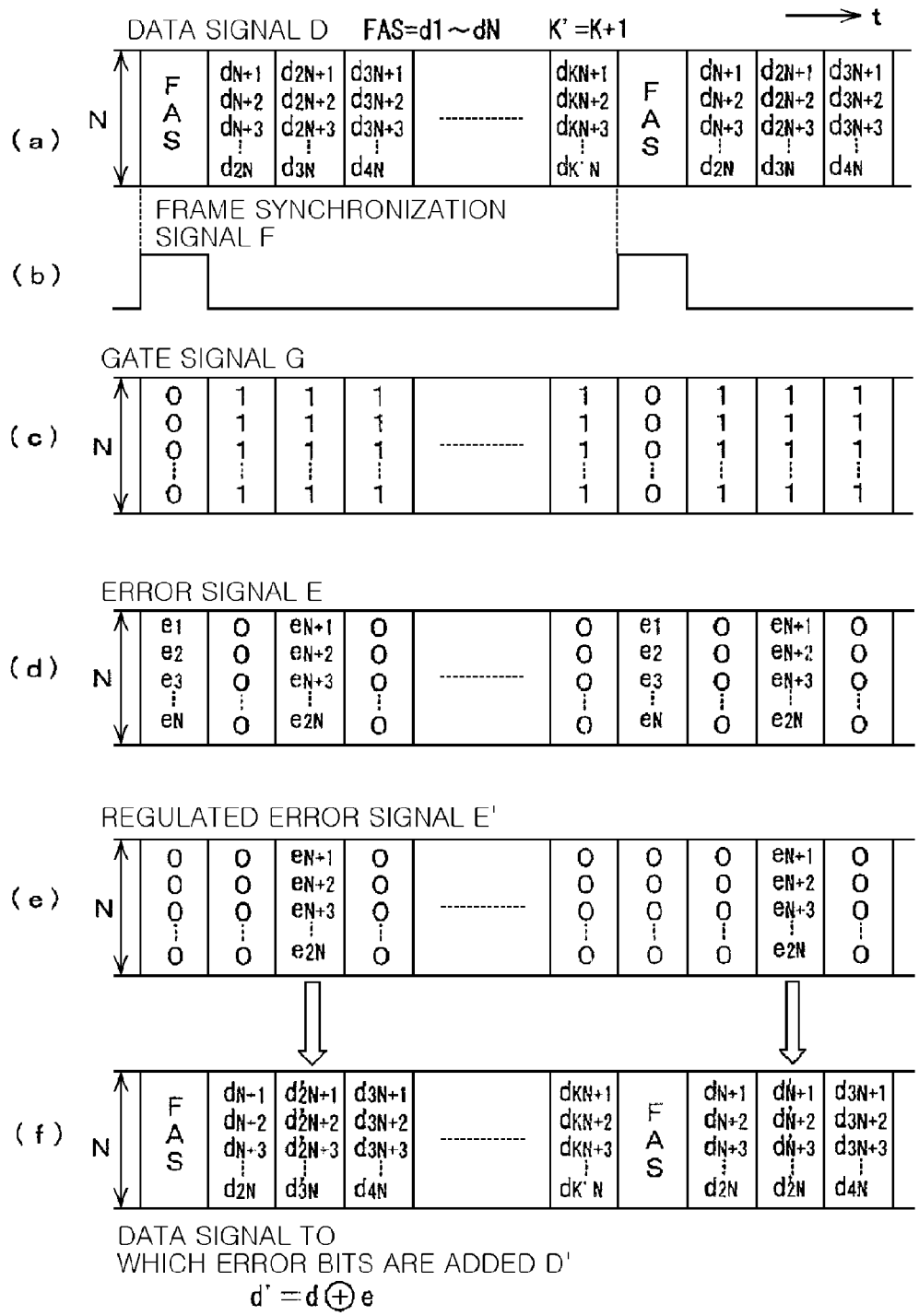
FIG. 4 is an explanatory diagram of an operation when the bit length of an FAS is identical with a data width.

FIG. 4 shows an example of the operation in the case in which, as shown in FIG. 4(a), an FAS placed at the front of a data signal D is N bits. In this case, the gate signal generator 31 outputs a gate signal G in which all N bits are 0 to the gate circuit 32 (refer to FIG. 4(c)) at the start timing of a frame synchronization signal F shown in FIG. 4(b).

Accordingly, for example, as shown in FIG. 4(d), although the error signal $E(=e_1$ to $e_N)$ is outputted from the error signal generation unit 11 at a timing at which the FAS of the data signal D is inputted, the error signal $E(=e_1$ to $e_N)$ is blocked by the gate circuit 32 of the error addition regulation unit 30. Accordingly, as shown in FIG. 4(e), only the error signal $E(=e_{N+1}$ to $e_{2N})$ generated at the timing at which the data signal D of N bits, not including an FAS, is inputted.

Thus, the error signal $E'(=e_{N+1}$ to $e_{2N})$, outputted during the period in which the data signal D of N bits, not including an FAS, is inputted, together with the data signal D, is inputted to the error addition unit 12 as a valid signal. Accordingly, as shown in FIG. 4(f), a data signal D' in which an error is not added to the region into which the FAS has been inserted and errors are added to positions other than the region into which the FAS has been inserted is generated and outputted.

Although a test for the FEC function of a target test apparatus is performed using the data signal D' obtained as above while changing an output rate of the error signal E using the error signal generation unit 11 as described above, the addition of an error to a region of the data signal D' into which an FAS has been inserted is restricted. Accordingly, although an error rate is high, the test can be performed with frame synchronization established.

Figure 5:
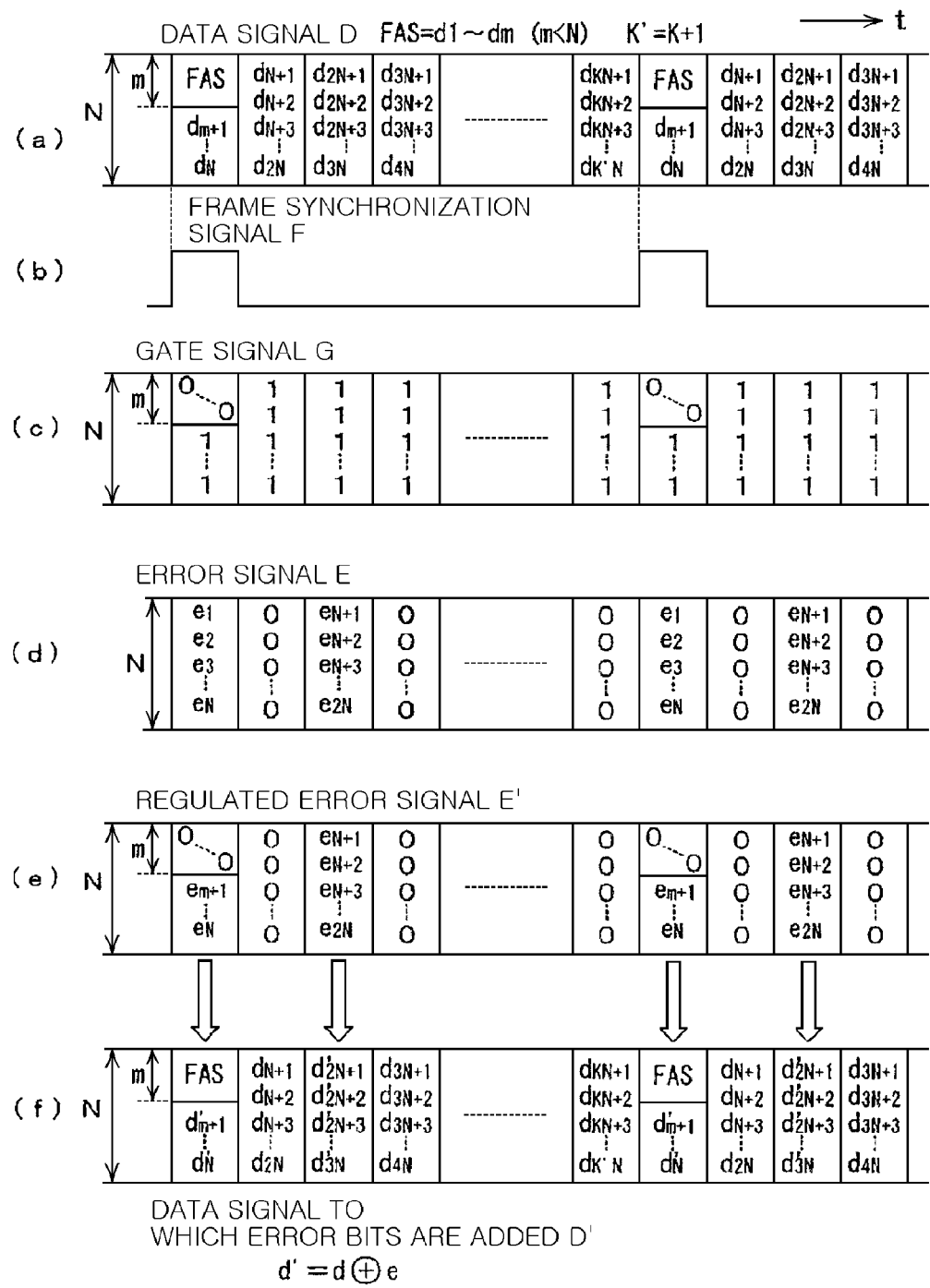
FIG. 5 is an explanatory diagram of an operation when the bit length of an FAS is shorter than a data width.
Figure 6:
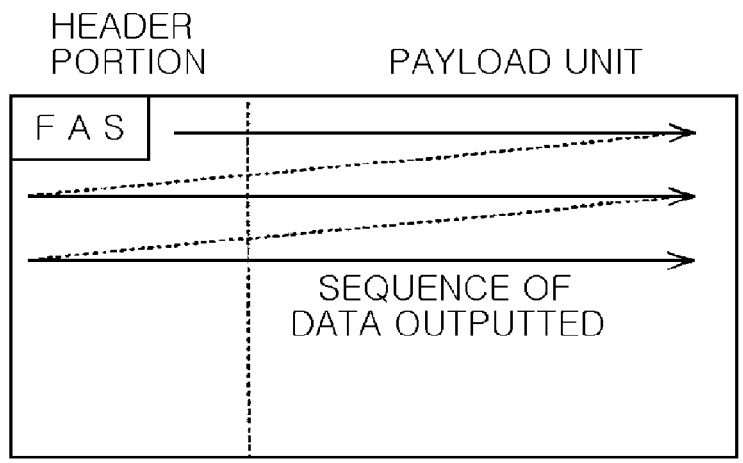
FIG. 6 is a diagram showing an example of a frame format.
Figure 7:
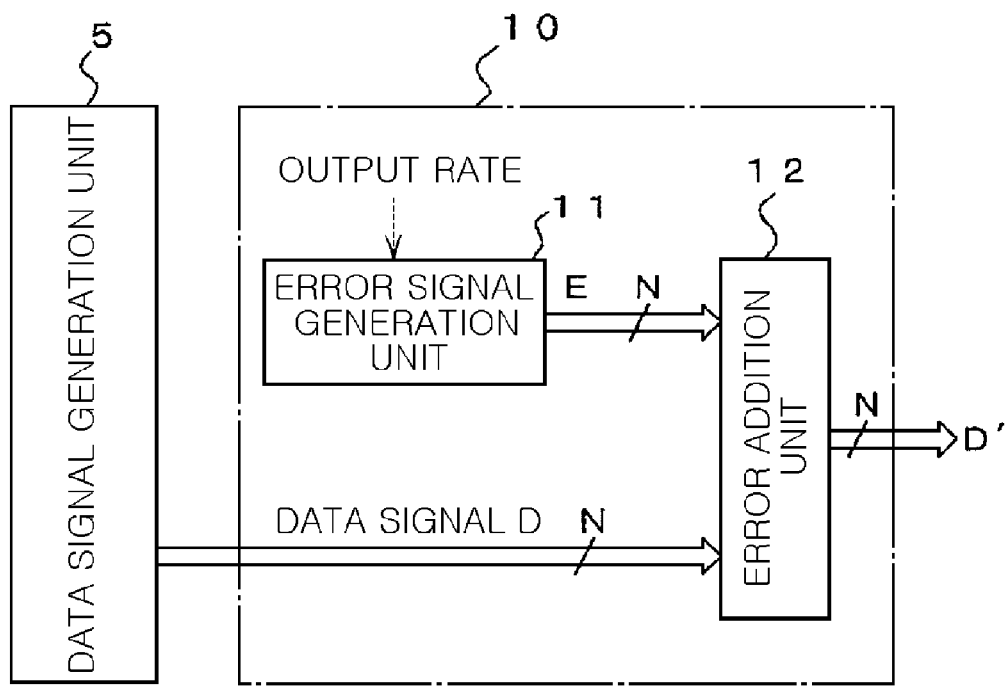
FIG. 7 shows the configuration of a conventional apparatus.

FIG. 5 shows an example of the operation in the case in which, as shown in FIG. 5(a), an FAS placed at the front of the data signal D has m bits shorter than N bits. In this case, the gate signal generator 31 outputs a gate signal G in which all m bits from the front, from among the N bits, are 0 and the remaining N-m bits are all 1, as shown in FIG. 5(c) to the gate circuit 32 at the start timing of a frame synchronization signal F shown in FIG. 5(b).

In this case, although an error signal $E(=e_1$ to $e_N)$ is being outputted from the error signal generation unit 11 at a timing at which data of N bits placed at the front of a data signal D, including an FAS, are inputted as shown in FIG. 5(d), m bits ($e_1$ to $e_m$) from among the error signal $E(=e_1$ to $e_N)$ are blocked by the gate circuit 32 of the error addition regulation unit 30. Thus, as shown in FIG. 5(e), only an error signal $E'(=e_{m+1}$ to $e_N, e_{N+1}$ to $e_{2N})$ added to positions other than the region into which the FAS has been inserted is outputted. Accordingly, the error signal E', together with the data signal D, is inputted to the error addition unit 12. Consequently, a data signal D' in which an error is not added to the region into which the FAS has been inserted and errors are added to positions other than the region into which the FAS has been inserted is outputted as shown in FIG. 5(f).

Although a test for the FEC function of a target test apparatus is performed using the data signal D' obtained as above while changing an output rate of the error signal E using the error signal generation unit 11 as described above, the addition of an error to a region of the data signal D' into which an FAS has been inserted is restricted. Accordingly, although an error rate is high, the test can be performed with frame synchronization established.

The invention claimed is:

1. An error addition apparatus for receiving a data signal having a frame format having a specific signal inserted into its front, adding error bits to the data signal, and outputting a resulting signal, the error addition apparatus comprising:
an error addition regulation unit for receiving a frame synchronization signal, indicative of a timing at which the front of a frame of the data signal has been inputted, and regulating the error bits such that the error bits are added to positions other than a region of the specific signal;
wherein the error addition regulation unit comprises a gate signal generation unit and a gate circuit, and
the gate signal generation unit receives the frame synchronization signal, generates a gate signal, including bit data having a predetermined number of bits at a timing at which the bit data, having the predetermined number of bits and including the region of the specific signal at the front of the data signal, are outputted based on frame information of the data signal, and outputs the generated gate signal to the gate circuit.

2. An error addition apparatus for receiving a data signal having a frame format having a specific signal inserted into its front, adding error bits to the data signal, and outputting a resulting signal, the error addition apparatus comprising:
an error addition regulation unit for receiving a frame synchronization signal, indicative of a timing at which the front of a frame of the data signal has been inputted, and regulating the error bits such that the error bits are added to positions other than a region of the specific signal;
wherein the error addition regulation unit comprises a gate signal generation unit and a gate circuit,
the gate signal generation unit receives the frame synchronization signal, generates a gate signal, including bit data having a predetermined number of bits at a timing at which the bit data, having the predetermined number of bits and including the region of the specific signal at the front of the data signal, are outputted based on frame information of the data signal, and outputs the generated gate signal to the gate circuit, and
the error addition regulation unit regulates the error bits such that the error bits are added to the positions other than the region of the specific signal, based on the frame synchronization signal of the data signal and the frame information of the data signal.

3. An error addition apparatus for receiving a data signal having a frame format having a specific signal inserted into its front, adding error bits to the data signal, and outputting a resulting signal, the error addition apparatus comprising:
an error addition regulation unit for receiving a frame synchronization signal, indicative of a timing at which the front of a frame of the data signal has been inputted, and regulating the error bits such that the error bits are added to positions other than a region of the specific signal;
wherein frame information is a bit length of a Frame Alignment Signal (FAS), which is the specific signal at the front of a frame,
the error addition regulation unit comprises a gate signal generation unit and a gate circuit, and
the gate signal generation unit receives the frame synchronization signal, generates a gate signal, including bit data having a predetermined number of bits at a timing at which the bit data, having the predetermined number of bits and including the region of the FAS at the front of the data signal, are outputted based on the frame information of the data signal, and outputs the generated gate signal to the gate circuit.

4. An error addition apparatus for receiving a data signal having a frame format having a specific signal inserted into its front, adding error bits to the data signal, and outputting a resulting signal, the error addition apparatus comprising:
an error addition regulation unit for receiving a frame synchronization signal, indicative of a timing at which the front of a frame of the data signal has been inputted, and regulating the error bits such that the error bits are added to positions other than a region of the specific signal;
wherein the error addition regulation unit comprises a gate signal generation unit and a gate circuit,
the gate signal generation unit receives the frame synchronization signal, generates a gate signal, including bit data having a predetermined number of bits at a timing at which the bit data, having the predetermined number of bits and including the region of the specific signal at the front of the data signal, are outputted based on frame information of the data signal, and outputs the generated gate signal to the gate circuit,
the error addition regulation unit regulates the error bits such that the error bits are added to the positions other than the region of the specific signal, based on the frame synchronization signal of the data signal and the frame information of the data signal, and
the frame information is a bit length of a Frame Alignment Signal (FAS), which is the specific signal at the front of a frame.

* * * * *